(12) United States Patent
Selenius

(10) Patent No.: US 9,162,913 B2
(45) Date of Patent: Oct. 20, 2015

(54) MIXER ASSEMBLY FOR DIGESTION TANK

(75) Inventor: Per Selenius, Täby (SE)

(73) Assignee: XYLEM IP HOLDINGS LLC, White Plains, NY (US)

(*) Notice: Subject to any disclaimer, the term of this patent is extended or adjusted under 35 U.S.C. 154(b) by 49 days.

(21) Appl. No.: 13/696,515

(22) PCT Filed: Apr. 18, 2011

(86) PCT No.: PCT/SE2011/050467
§ 371 (c)(1),
(2), (4) Date: Nov. 6, 2012

(87) PCT Pub. No.: WO2011/139209
PCT Pub. Date: Nov. 10, 2011

(65) Prior Publication Data
US 2013/0044562 A1 Feb. 21, 2013

(30) Foreign Application Priority Data
May 6, 2010 (SE) .................................... 1050447

(51) Int. Cl.
*B01F 7/00* (2006.01)
*C02F 11/04* (2006.01)
*A01C 3/02* (2006.01)
(Continued)

(52) U.S. Cl.
CPC ................ *C02F 11/04* (2013.01); *A01C 3/026* (2013.01); *B01F 7/22* (2013.01); *B01F 15/00707* (2013.01); *C02F 3/2866* (2013.01);
(Continued)

(58) Field of Classification Search
CPC ................... B01F 15/00701; B01F 15/00707; B01F 15/0072

USPC .......................................................... 366/331
See application file for complete search history.

(56) References Cited

U.S. PATENT DOCUMENTS 2,978,233 A    4/1961   Kingsley
3,977,655 A    8/1976   Okabayashi et al.
(Continued)

FOREIGN PATENT DOCUMENTS

CN    2755350 Y    2/2006
CN    201132110 Y  10/2008
(Continued)

OTHER PUBLICATIONS

Definition of swivel, merriam-webster.com/dictionary/swivel, updated Jun. 23, 2007, accessed via Internet Archive Wayback Machine Jan. 29, 2015.*

(Continued)

*Primary Examiner* — Charles Cooley
*Assistant Examiner* — Marc C Howell
(74) *Attorney, Agent, or Firm* — Browdy and Neimark, PLLC

(57) ABSTRACT

The invention relates to a mixer assembly for agitating material in a digestion tank (1), comprising a drive unit (7, 8, 9) and an output shaft (10) extending from said drive unit, which output shaft is arranged to hang down into said digestion tank (1) rotatably suspended from the drive unit. According to the invention the mixer assembly (6) furthermore comprises a stabilizer (12) comprising a swivel (13) and at least one resilient element (14) connected to said swivel (13), the stabilizer (12) being connected to the lower end of the output shaft (10) of the mixer assembly (6) and being arranged to be connected to a floor (2) of said digestion tank.

8 Claims, 4 Drawing Sheets

(51) Int. Cl.
*B01F 7/22* (2006.01)
*B01F 15/00* (2006.01)
*C02F 3/28* (2006.01)
*C02F 103/00* (2006.01)

(52) U.S. Cl.
CPC ..... *C02F2103/005* (2013.01); *C02F 2203/006* (2013.01); *F16C 2320/16* (2013.01); *Y02W 10/12* (2015.05)

(56) References Cited

U.S. PATENT DOCUMENTS

| | | | |
|---|---|---|---|
| 4,660,989 A | | 4/1987 | Davis |
| 4,823,926 A | * | 4/1989 | Wittler et al. ............... 192/18 B |
| 5,088,832 A | * | 2/1992 | Gambrill et al. ............. 366/314 |
| 5,618,107 A | * | 4/1997 | Bartsch ........................ 366/279 |
| 6,089,748 A | | 7/2000 | McDermott et al. |
| 6,280,077 B1 | * | 8/2001 | Sullivan, Jr. ................. 366/247 |
| 2002/0176322 A1 | * | 11/2002 | Kupidlowski ............. 366/330.3 |
| 2006/0215488 A1 | * | 9/2006 | Blakley ........................ 366/331 |
| 2008/0248519 A1 | * | 10/2008 | Friedmann et al. ............. 435/41 |

FOREIGN PATENT DOCUMENTS

| | | |
|---|---|---|
| CN | 101474542 A | 7/2009 |
| GB | 853652 A | 11/1960 |
| JP | 51-63060 | 11/1974 |
| JP | 52-134872 | 4/1976 |
| JP | 57-171426 | 10/1982 |
| JP | 57171426 A | 10/1982 |
| WO | 2010/007418 A2 | 1/2010 |

OTHER PUBLICATIONS

Definition of resilient, merriam-webster.com/dictionary/resilient, updated Sep. 5, 2006, accessed via Internet Archive Wayback Machine Jan. 29, 2015.*

Fibre-reinforced plastic, en.wikipedia.org/wiki/Fibre-reinforced_plastic, updated May 2, 2009, accessed via Internet Archive Wayback Machine Jan. 29, 2015.*

English Translation of Office Action issued Apr. 3, 2014, in corresponding Japanese Patent Application No. 201180022661.

Robert L. Mott "Machine elements in Mechanical Design" (4th Edition), Prentice Hall, Jul. 26, 2003.

English Translation of Office Action issued Jan. 21, 2014, in corresponding Japanese Patent Application No. 2013-509024.

Chinese Notification of the Second Office Action for Chinese Patent Appln. No. 201180022661.9 dated Dec. 10, 2014.

* cited by examiner

MIXER ASSEMBLY FOR DIGESTION TANK

TECHNICAL FIELD OF THE INVENTION

The present invention relates in general to a digestion tank for digestion of excrements, but also other applications comprising a chamber and a mixer assembly are referred to. The material present in the chamber is referred to as a fluid mixture, a suspension, a solid material in the form of powder or granulate, etc., requiring agitation. The present invention relates especially to a mixer assembly for agitating material in a chamber, which mixer assembly comprises a drive unit and an output shaft extending from said drive unit, which output shaft is arranged to hang down into said chamber rotatably suspended from the drive unit.

BACKGROUND OF THE INVENTION AND PRIOR ART

A common type of digestion tank comprises a mixer assembly for agitating the excrement, or mixture of fluid and sludge, present in the chamber. Such applications comprise tanks having a depth from about 10 meters to about 40 meters, however a common depth is about 15-25 meters. Furthermore such tanks have a volume of several thousands of cubic meters, in which excrements, feaces, sludge, waste water, or the like is stored and digested in order to extract methane gas and carbon dioxide, for example. The liquid/sludge is kept in movement by agitation in order to not having the sludge to sediment and in order to not causing a dense cake at the surface of the liquid/sludge, and thereto in order to obtain an as homogenous mixture as possible which entail that most possible quantities of various gases may be extracted. It shall be pointed out that other materials than excrement suspensions, such as fluid mixtures, industrial suspensions, solid material in the form of powder or granulate, may be stored in similar conditions in which agitation takes place. Common for the applications for which the present invention is intended is that the maintenance staff cannot, are not allowed to or does not want to perform work in the chamber during long periods of time, for instance one or several years.

Mixer assemblies suitable for use in a digestion tank or the like comprises a motor and a gear box that lowers the rotational speed of the output shaft of the mixer assembly to about 15-30 revolutions per minute, even though other speeds may be used. The output shaft rotatably suspended from the drive unit of the mixer assembly and usually hang down freely straight down into the chamber, whereupon the lower end of the output shaft usually is located at a distance of 6-12 meters from the floor of the chamber, and whereupon a propeller unit is located at the lower end. Such propeller units may have a diameter of 1-6 meters, and the output shaft may have a length of for instance about 10-30 meters and a diameter of for instance 10-30 centimeters.

If an unbalance appear in the mixer assembly, i.e. if the output shaft starts to perform a nutatinq movement or starts to deflect/oscillate during rotation or wriggle, and the mixer assembly is not immediately turned off, the mixer assembly as well as the chamber runs the risk of getting damaged. Unbalance may for instance arise due to the fact that a blade has come loose from the propeller unit, that solid material has become stock to the blades of the propeller unit, that a settlement/inclination of the tank takes place which makes the drive unit to incline in relation to a plumb line, etc.

A known way of preventing that a mixer assembly and/or the chamber will become damaged in the case such an unbalance arise is to lengthen the output shaft such that it extends towards and terminates at a distance from the floor, a steel ring having a for instance twice as big diameter than the diameter of the output shaft being arranged near to the lower end of the output shaft. If unbalance arises and the output shaft starts to wriggle, its wriggling/deflection will be limited by the steel ring. However, the steel ring or its attachment to the chamber will already after a, in this connection, short time be damaged if the mixer assembly is not turned off. This known solution also requires an unnecessarily long and expensive output shaft.

Unbalance may also arise if the output shaft gets into natural frequency due to the critical number of revolutions, this is usually prevented by choosing the length of the output shaft in such a way that this phenomena does not arise. However, this constructional limitation may lead to the fact that the optimal length of the specific application cannot be used due to the inherent natural frequency of the output shaft.

OBJECT OF THE INVENTION

The present invention aims at obviating the above-mentioned disadvantages and failings of previously know mixer assemblies and at providing an improved mixer assembly. A primary object of the present invention is to provide an improved mixer assembly of the initially defined type, which secure that neither the mixer assembly nor the chamber runs the risk of getting damaged if unbalance/wriggling arises in the output shaft.

It is another object of the present invention to provide a mixer assembly, in which the length of the output shaft and other dimensions unrestraintly may be determined based on the optimal for the specific application.

BRIEF DESCRIPTION OF THE INVENTION

According to the invention at least the primary object is attained by means citric initially defined mixer assembly, which is characterized in that it comprises a stabilizer comprising a swivel and at least one resilient element connected to said swivel, the stabilizer being connected to the lower end of the output shaft of the mixer assembly and being arranged to be connected to said chamber.

The present invention is thus based on the insight that the output shaft does not need to be unnecessarily lengthened and that the dimensions of the output shaft does not need to be chosen taking the inherent natural frequency of the output shaft into consideration. The use of the swivel and the resilient element, which are interconnected, entail that the output shaft may rotate unlimited and the more the output shaft will deflect/wriggle the more the resilient element will counteract the deflection/wriggle.

Preferred embodiments of the present invention are further defined in the dependent claims.

Preferably the swivel comprises a first element arranged to be driven in rotation about the output shaft of the mixer assembly, and a second element arranged to be connected the floor of the chamber, and a bearing arranged at the interface between the first element and the second element. According to the invention the resilient element may be arranged between the lower end of the output shaft and the first element, of the swivel or between the second element of the swivel and the floor of the chamber.

Preferably the stabilizer also comprises an anchor rod axially connected to the resilient element, which anchor rod is arranged to be connected to the floor of said chamber. This entails that one and the same stabilizer may be used independently of the distance between the lower end of the output shaft and the floor of the chamber.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the other dependent claims as well as from the following detailed description of preferred embodiments in conjunction with the appended drawings, which are not drawn to scale and wherein:

DETAILED DESCRIPTION OF PREFERRED EMBODIMENTS

The present invention relates in general to a plant for digestion of excrements, however the invention is not limited to this field of use or application.

Figure 1:
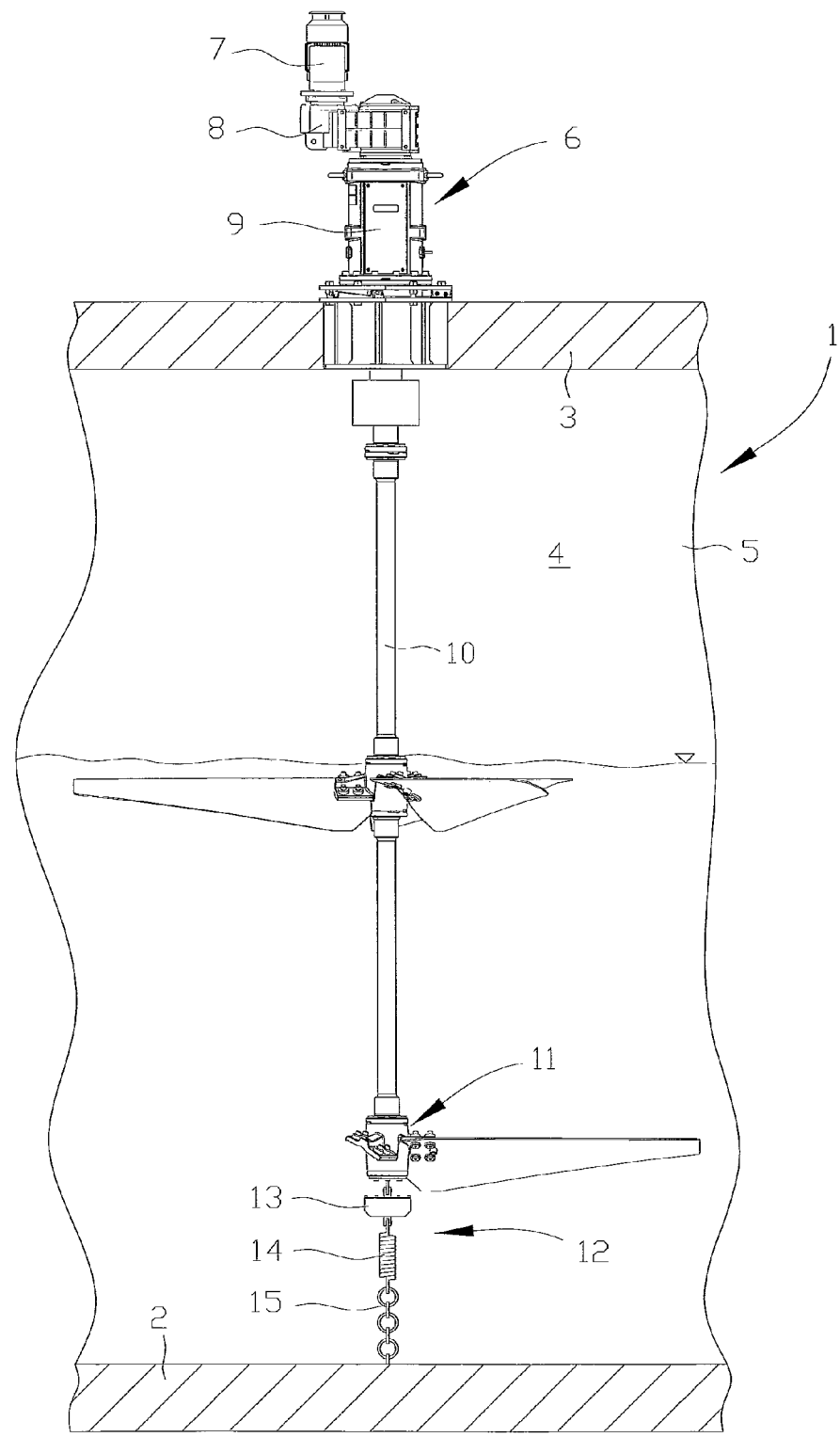
FIG. 1 is a schematic side view of a cut-away chamber and an inventive mixer assembly, note that some blades are removed for the sake of clarity.

In FIG. 1 is shown a part of a chamber, digestion tank or tank, generally designated 1, comprising a floor 2, a roof 3 and a circumferential wall shell 4, which together enclose a volume 5 for housing excrements, feaces, sludge, waste water, suspensions or the like material, that shall be digested, stored and/or processed. However, it shall be pointed out that the chamber 1 also may house solid material in the form of powder or granulate, etc., for storing and/or processing thereof. Central for the invention is that the material that is housed in the chamber 1 require agitation, independently of the material being solid, liquid or a mixture thereof, however the invention will hereafter be described arranged in a digestion tank.

Furthermore, an inventive mixer assembly, generally designated 6, is shown in FIG. 1, which mixer assembly comprises a drive unit having a motor 7, a gear box 8 and a stand 9, and one from the drive unit extending output shaft 10 being rotatably suspended from the drive unit. Furthermore, at least one propeller unit 11 is connected to the output shaft 10, whereupon the output shaft 10 and the propeller unit 11 are arranged to be driven in rotation about a plumb line. Preferably two of three propeller units 11 are connected to the output shaft 10.

In the embodiment shown in FIG. 1 the mixer assembly 6 comprises two propeller units 11, a lower propeller unit arranged at the free lower end of the output shaft 10 and an upper propeller unit arranged at a suitable location between the lower propeller unit and the drive unit. Preferably the lower propeller unit is located at a distance from the floor 2 of the chamber 1 that is greater than the diameter of the propeller unit 11, preferably greater than 1.5 times the diameter of the propeller unit 11, most preferably about twice the diameter of the propeller unit 11. Furthermore the upper propeller unit is preferably located at a height in the chamber 1 located in the area of the surface of the housed liquid/suspension. The main object of the lower propeller unit is to cause agitation, and the main object of the upper propeller unit is to break the cake of solid material that may be form at the surface of the housed liquid in such applications. It shall be pointed out that the lower propeller unit may be located at a distance from the free lower end of the output shaft 10, i.e. that the output shaft 10 extends downwardly from the lower propeller unit in order to minimize the distance between the free lower end of the output shaft 10 and the floor 2 of the chamber.

Furthermore the inventive mixer assembly 6, as shown in FIG. 1, comprises a stabilizer, generally designated 12. In a preferred embodiment the stabilizer 12 comprises a swivel 13 and a resilient element 14 axially connected to said swivel 13. The resilient element 14 may be directly or indirectly connected to the swivel 13, and thereto the resilient element 14 may be arranged axially above or axially below the swivel 13. The stabilizer 12 is connected to a lower end of the output shaft 10 of the mixer assembly 6 and is furthermore arranged to be connected to the chamber 1, preferably to the floor 2 of the chamber 1. In a preferred embodiment the resilient element 14 is constituted by a coil spring, which preferably is biased during mounting of the mixer assembly 6 and the stabilizer 12, and which preferably is located axially below the swivel 13.

In a preferred embodiment the stabilizer 12 also comprises a chain 15, wire, or a similar more or less rigid anchor rod, axially connected to the resilient element 14 and the swivel 13. The anchor rod or the chain 15 may be directly or indirectly connected to the swivel 13 and/or the resilient element 14, and thereto the chain 15 may be arranged axially above the resilient element 14 and the swivel 13, axially below the swivel 13 and the resilient element 14, or between the swivel 13 and the resilient element 14. Preferably the chain 15 is arranged to be connected to the floor 2 of the chamber 1, via a ring or the like (not shown). The chain 15 entails that the distance between the lower end of the output shaft 10 and the floor 2 of the chamber 1 does not need to be known before the installation of the mixer assembly 6, instead the length of the chain 15 may be adjusted to the specific application during installation.

In an alternative embodiment (not shown) the stabilizer 12 comprises a swivel 13 and at least three resilient elements which are at least partly radially connected to said swivel 13. Preferably said at least three resilient elements are connected to the swivel 13 having mutually equidistant distance. Furthermore it is preferred that said at least three resilient elements are connected to and are arranged at an angle to the floor 2 of the chamber, which angle preferably is smaller than 45 degrees in an alternative embodiment said at least three resilient elements are connected to the wall shell 4 of the chamber. Furthermore, an anchor bar 15 described above may be connected to each of said at least three resilient elements. It shall be pointed out that the swivel 13 has to be arranged between the output shaft 10 and said at least three resilient elements.

Reference is now also made to FIGS. 2-6, in which a first, a second and a third embodiment, respectively, of the swivel 13 are shown. The swivel 13 comprises in the shown embodiments a first element 16 arranged to be driven in rotation about the output shaft 10 of the mixer assembly 6, a second element 17 arranged to be connected to said floor 2 of the chamber 1, and a bearding 18 arranged at the interface between the first element 16 and the second element 17. The bearing 18 is arranged to admit mutual rotation between the first element 16 and the second element 17, and to transmit an axially directed pulling force between the first element 16 and the second element 17.

Figure 2:
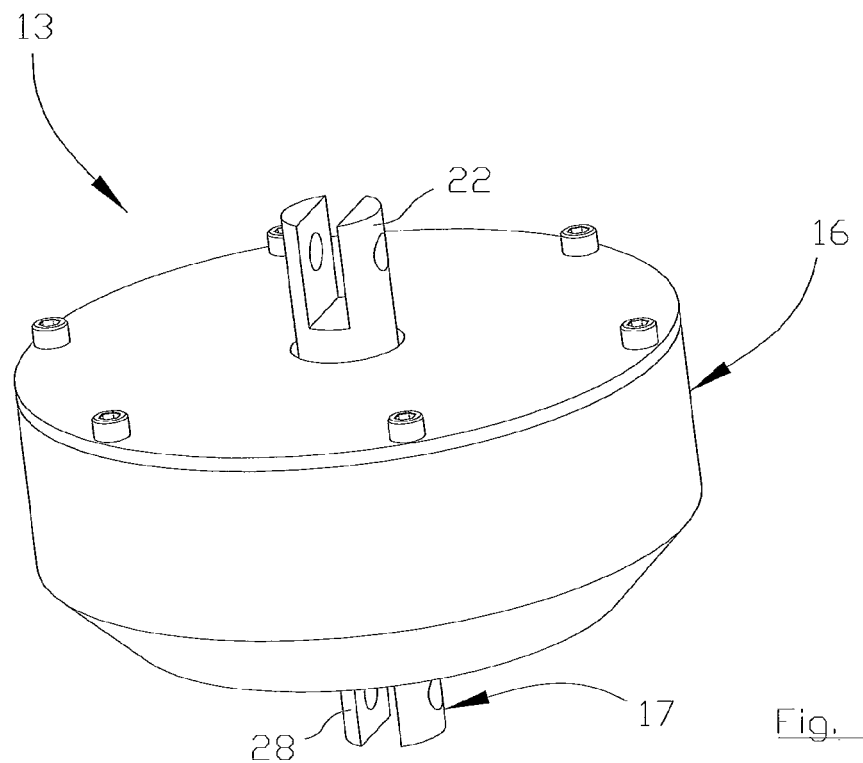
FIG. 2 is a perspective view of a first embodiment of the swivel of the mixer assembly.
Figure 3:
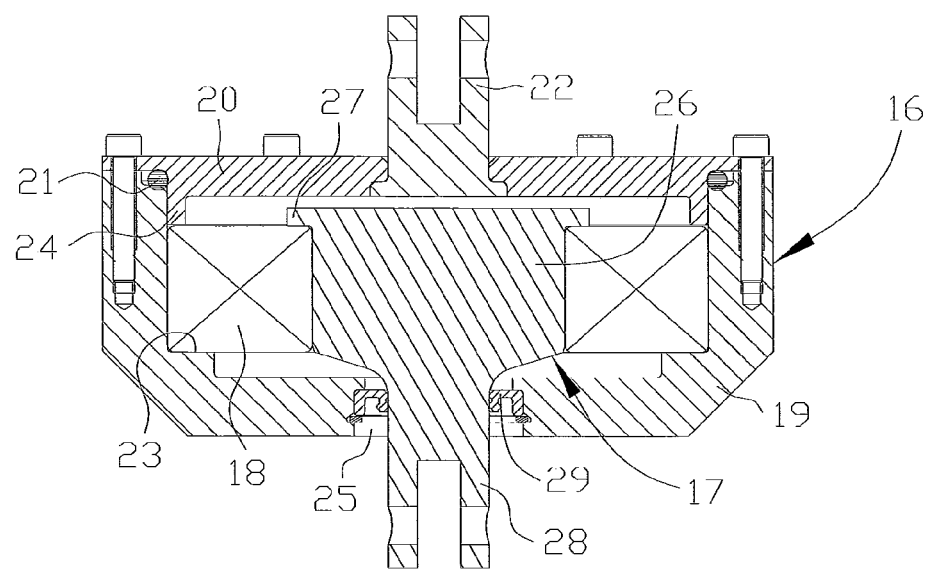
FIG. 3 is a cross sectional side view of the swivel according to FIG. 2.

According to the first embodiment of the swivel 13, see FIGS. 2 and 3, the first element 16 comprises a bowl shaped house 19 and a lid 20 cooperating with the house 19. The lid 20 is preferably releasably connected to the house 19. Furthermore, a sealing 21 is arranged at the interface between the lid 20 and the house 19, in order to prevent the material present in the chamber 1 from entering and running the risk, of damaging the swivel 13. Further, a first connection. 22 of the swivel 13 is fixedly connected to the lid 20, which first connection 22, in the preferred embodiment of the stabilizer 12, is arranged to be connected to an interacting connection not shown) of the output shaft 10 of the mixer assembly 6.

On the inside of the house 19 is presented a bearing seat. 23 for the bearing 18, which in the axial direction preferably is fixed to the bearing seat 23 by a collar 24 of the lid 20 interjecting into the house 19. Alternatively a clamp ring (not shown) or the like may be used to fixate the bearing 18 in the axial direction in the bearing seat 23. Further, the house 19 is provided with a hole 25 interconnecting the outside and the inside of the house 19. The hole 25 is located on the opposite side of the first element 16 in relation to the first connection 22, preferably the hole 25 and the first on 22 are coaxially arranged, and preferably the hole 25 is centered in the bowl shaped house 19 in the radial direction.

The second element 17 of the swivel 13 comprises a first part 26 located on the inside of the house 19 and in engagement with the bearing 18 in such a way that the second element 17 is prevented from being axially displaced away from the first connection. 22 at the same time as the second element 17 is admitted to freely rotate in relation to the first element 16. Preferably the first part 26 of the second element 17 comprises a radially protruding flange 27, which in the axial direction is located between the bearing 18 and the first connection 22. The bearing 18 is in the first embodiment of the swivel 13 preferably a ball bearing or a thrust bearing, more preferably an axial ball bearing or a spherical ball bearing.

Furthermore, the second element 17 comprises a second connection 28 of the swivel 13, which second connection 28 is fixedly connected to the first part 26 of the second element 17, and which protrudes through the hole 25 of the first element 16. A sealing 29 is arranged in the hole 25 between the house 19 and the second connection 28, in order to prevent the material present in the chamber 1 from entering and running the risk of damaging the swivel 13. The second connection 28 is, in the preferred embodiment of the stabilizer 12, arranged to be connected to the resilient element 14.

It shall be pointed out that the swivel 13 according to the first embodiment can be turned 180 degrees about a horizontal axis such that the second element 17 is arranged to be connected to the cooperating connection of the output shaft 10 of the mixer assembly 6, and that the first element 16 is arranged to be connected to the resilient element 14.

Figure 4:
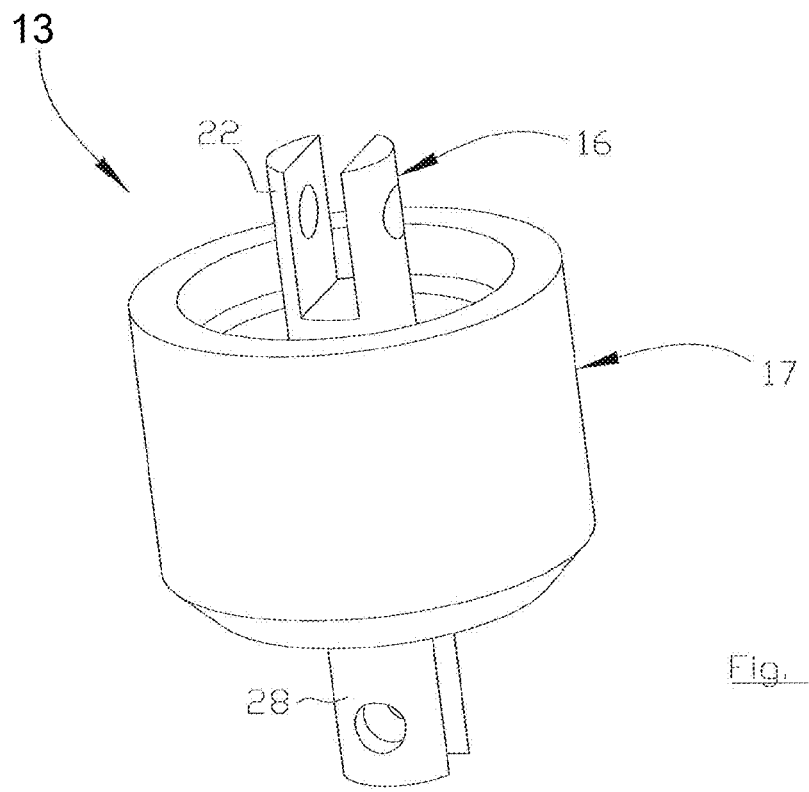
FIG. 4 is a perspective view of a second embodiment of the swivel of the mixer assembly.
Figure 5:
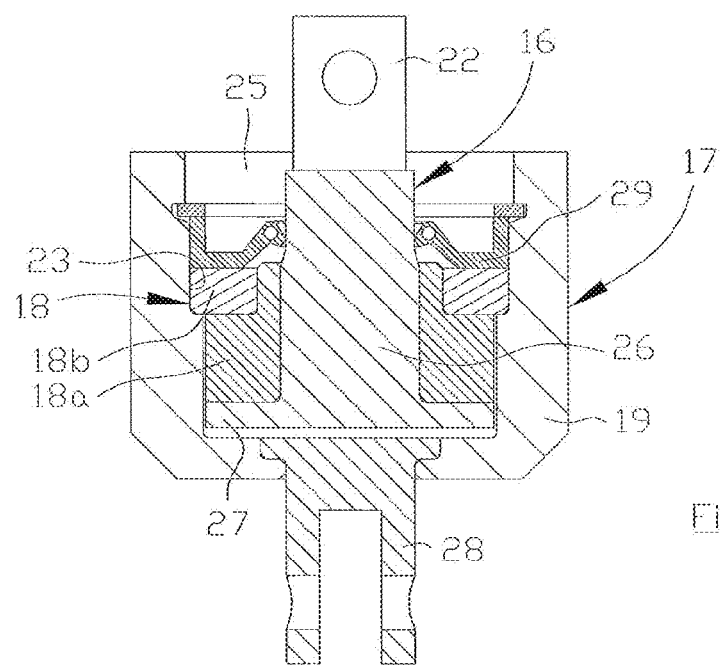
FIG. 5 is a cross sectional side view of the swivel according to FIG. 4.

Reference is now made to FIGS. 4 and 5, in which the elements corresponding to elements of the first embodiment according to FIGS. 2 and 3 are denoted by the same reference number. According to the second embodiment of the swivel 13 the second element 17 comprises a bowl shaped house 19, a second connection 28 of the swivel 13 being fixedly connected to the house 19, which second connection 28, in the preferred embodiment of the stabilizer 12, is arranged to be connected to the resilient element 14. Furthermore the house 19 is provided with a hole 25 interconnecting the outside and the inside of the house 19. The hole 25 is located on the opposite side of the second element 17 in relation to the second connection 28, preferably the hole 25 and the second connection 28 are coaxially arranged, and preferably the hole 25 is centered in the bowl shaped house 19. A bearing seat 23 for the bearing 18 is provided on the inside of the house 19.

The first element 16 of the swivel 13 comprises a first part 26 located on the inside of the house 19 and in engagement with the bearding 18 in such a way that the first element 16 is prevented from being displaced in the axial direction away from the second connection 28 at the same time as the second element 17 is admitted to freely rotate in relation to the first element 16.

Preferably the first part 26 of the first element 16 comprises a radially protruding flange 27 that in the axial direction is located between the bearing 18 and the second connection 28. Furthermore, the first element 16 comprises a first connection 22 of the swivel 13, which first connection 22 is fixedly connected to the first part 26 of the first element 16, and which protrudes through the hole 25 of the second element 17.

A sealing 29 is arranged in the hole 25 between the house 19 and the first connection 22, in order to prevent the material present in the chamber 1 from entering and running the risk of damaging the swivel 13. Said sealing 29, and/or a clamp ring or the like, is arranged to fixate the bearing 18 in the bearing seat 23 in the axial direction. The bearing 18 is in the second embodiment of the swivel 13 preferably a slide bearing. In the shown second embodiment the bearing 18 comprises a first body. 18a fixedly connected to the first element. 16 and a second body 18b fixedly connected to the second element 17, which bodies abut and glide against, each other.

The first connection 22 is, in the preferred embodiment of the stabilizer 12, arranged to be connected to the cooperating connection of the output shaft 10 of the mixer assembly 6. It shall be pointed out that the swivel 13 according to the second embodiment may be turned 180 degrees about a horizontal axis such that the second element 17 is arranged to be connected to cooperating connection of the output shaft 10 of the mixer assembly 6, and that the first element 16 is arranged to be connected to the resilient element 14.

Figure 6:
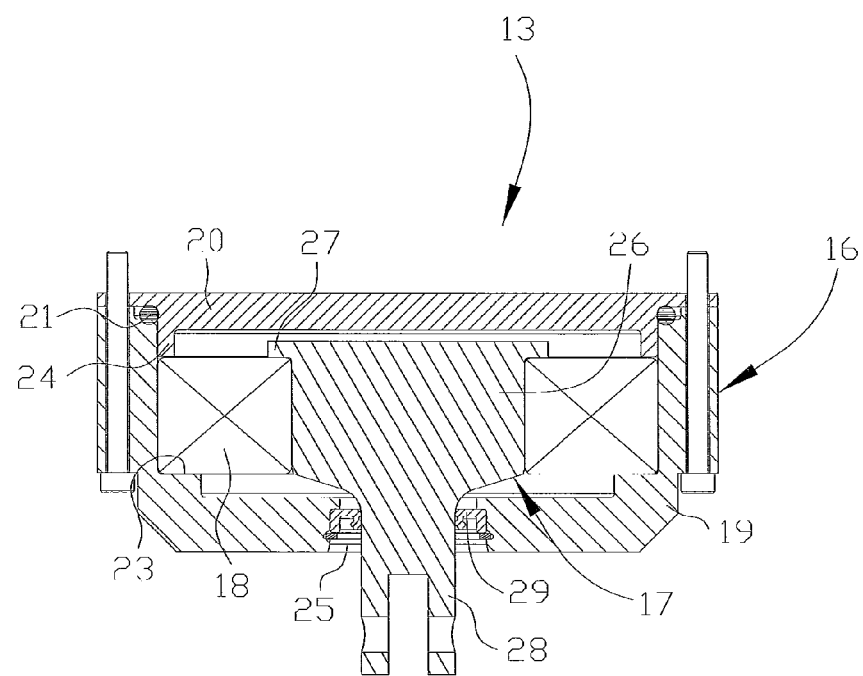
FIG. 6 is a cross sectional side view of a third embodiment of the swivel of the mixer assembly.

Reference is now made to FIG. 6, in which elements corresponding to elements in the first embodiment according to FIGS. 2 and 3 are denoted by the same reference number. According to the third embodiment of the swivel 13 the first element 16 comprises a bowl shaped house 19 and preferably a lid 20 cooperating with the house 19. The lid 20 is preferably releasably connected to the house 19. Furthermore, a sealing 21 is arranged at the interface between the house 19 and the lid 20, in order to prevent the material present in the chamber from entering and running the risk of damaging the swivel 13. Furthermore, the first element 16 is, in the preferred embodiment of the stabilizer 12, arranged to be fixedly connected to the free end of the output shaft 10 of the mixer assembly 6, for instance by means of bolts.

A bearing seat 23 for the bearing 18 is present on the inside of the house 19, which bearing 18 preferably is fixated in the axial direction in the bearing seat 23 by a collar 24 of the lid 20 interjecting into the house 19. Alternatively a clamp ring (not shown) or the lift may be used in order to fixate the bearing 18 in the bearing seat 23 in the axial direction. Furthermore, the house 19 is provided with a hole 25 interconnecting the outside and the inside of the house 19. The hole 25 is located on the opposite side of the first element 16 in relation to the lid 20, preferably the hole 25 is centered in the bowl shaped house 19.

The second element 17 of the swivel 13 comprises a first part 26 located on the inside of the house 19 and in engagement with the bearding 18 in such a way that the second element 17 is prevented from being displaced in the axial direction away from the lid 20 at the same time as the second element 17 is admitted to freely rotate in relation to the first element 16. Preferably the first part 26 of the second element 17 comprises a radially protruding flange 27 that in the axial direction is located between the bearing 18 and the lid 20. The bearing 18 is in the third embodiment of the swivel 13 preferably a ball bearing or a thrust bearing, more preferably an axial ball bearing or a spherical ball bearing.

Furthermore, the second element 17 comprises a second connection 28 of the swivel 13, which second connection 28 is fixedly connected to the first part 26 of the second element 17, and which protrudes through the hole 25 of the first element 16. A sealing 29 is arranged in the hole 25 between the house 19 and the second connection 28, in order to prevent the material present in the chamber 1 from entering and running the risk of damaging the swivel 13. The second connection 28 is, in the preferred embodiment of the stabilizer 12, arranged to be connected to the resilient element 14.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall be pointed out that even thus it is not explicitly stated that features from a specific embodiment may be combined with features from another embodiment, the combination shall be considered obvious, if the combination is possible. For instance different described hearing types and also bearing types not explicitly described be used in all embodiments of the swivel, even if not explicitly stated.

The invention claimed is:

1. Mixer assembly for agitating material in a chamber (1), comprising a drive unit (7, 8, 9) and an output shaft (10) extending from said drive unit, which output shaft is arranged to hang down into said chamber (1) rotatably suspended from the drive unit, wherein the mixer assembly (6) furthermore comprises a stabilizer (12) comprising a swivel (13) and at least one resilient element (14) connected to said swivel (13), the stabilizer (12) being connected to the lower end of the output shaft (10) of the mixer assembly (6) and being arranged to be connected to said chamber (1), wherein the resilient element (14) is a coil spring.

2. Mixer assembly according to claim 1, wherein said at least one resilient element (14) is axially connected to said swivel (13).

3. Mixer assembly according to claim 1, wherein the swivel (13) comprises a first element (16) arranged to be driven in rotation about the output shaft (10) of the mixer assembly (6), a second element (17) arranged to be connected to the floor (2) of said chamber (1), and a bearing (18) arranged at the interface between the first element (16) and the second element (17).

4. Mixer assembly according to claim 3, wherein the first element (16) is fixedly connected to the free end of the output shaft (10) of the mixer assembly (6).

5. Mixer assembly according to claim 3, wherein the bearing (18) is a slide bearing.

6. Mixer assembly according to claim 3, wherein the bearing (18) is a ball bearing.

7. Mixer assembly according to claim 6, wherein the ball bearing is an axial ball bearing.

8. Mixer assembly according to claim 1, wherein the stabilizer (12) furthermore comprises an anchor rod (15) axially connected to the resilient element (14), which anchor rod (15) is arranged to be connected to the floor of said chamber (1).

\* \* \* \* \*